(12) United States Patent
Slavin et al.

(10) Patent No.: US 11,709,813 B2
(45) Date of Patent: Jul. 25, 2023

(54) SYSTEM AND METHOD FOR IMPLEMENTING A CONTRACT DATA MANAGEMENT MODULE

(71) Applicant: JPMorgan Chase Bank, N.A., New York, NY (US)

(72) Inventors: Ilya Slavin, Allen, TX (US); Michelle Roberts, St. Albans (GB); Ian Bone, Erskine (GB); Fernando Nitz, Buenos Aires (AR)

(73) Assignee: JPMORGAN CHASE BANK, N.A., New York, NY (US)

( * ) Notice: Subject to any disclaimer, the term of this patent is extended or adjusted under 35 U.S.C. 154(b) by 92 days.

(21) Appl. No.: 17/344,058

(22) Filed: Jun. 10, 2021

(65) Prior Publication Data
US 2022/0398236 A1 Dec. 15, 2022

(51) Int. Cl.
*G06F 16/22* (2019.01)
*G06F 16/953* (2019.01)
*G06F 16/28* (2019.01)

(52) U.S. Cl.
CPC ........ *G06F 16/2246* (2019.01); *G06F 16/288* (2019.01); *G06F 16/953* (2019.01)

(58) Field of Classification Search
CPC ... G06F 16/2246; G06F 16/953; G06F 16/288
USPC ........................................................ 707/711
See application file for complete search history.

(56) References Cited

U.S. PATENT DOCUMENTS

| 8,140,468 B2* | 3/2012 | Kwok | G06Q 10/10 707/600 |
| 9,218,429 B2* | 12/2015 | Levy | H04N 21/8586 |
| 11,216,248 B2* | 1/2022 | De Sousa Webber | G06F 16/3347 |
| 11,356,456 B2* | 6/2022 | Turgeman | H04L 63/102 |
| 11,409,904 B2* | 8/2022 | Turgeman | G06F 21/6245 |
| 2004/0133793 A1* | 7/2004 | Ginter | H04N 21/235 375/E7.009 |

(Continued)

OTHER PUBLICATIONS

Official Communication Received in PCT Application No. PCT/US2021/037866, dated Sep. 23, 2021.

(Continued)

*Primary Examiner* — Mark E Hershley
(74) *Attorney, Agent, or Firm* — Greenblum & Bernstein, P.L.C.

(57) ABSTRACT

A system and method for automatic generation of a data tree structure are disclosed. A database stores contract metadata associated with a plurality of contracts. The metadata includes relationship information data regarding parentage and/or child relationship between a particular contract and other contracts among the plurality of contracts. A processor operatively connects to the database via a communication network and accesses the database via the communication network to retrieve the contract metadata including the relationship information data. The processor also implements a search engine; stores the retrieved contract metadata including the relationship information data onto the search engine for creating a linkage between data points; and automatically generates, based on the created linkage between the data points, both an application programming interface (API) and a data tree structure that displays inter-dependency between two or more sets of contracts among the plurality of contracts.

15 Claims, 7 Drawing Sheets

(56) References Cited

U.S. PATENT DOCUMENTS

| | | | |
|---|---|---|---|
| 2010/0106752 A1* | 4/2010 | Eckardt, III | G06F 16/338 |
| | | | 715/854 |
| 2011/0208770 A1* | 8/2011 | Snider | G06F 16/9032 |
| | | | 707/769 |
| 2013/0254201 A1 | 9/2013 | Hatamoto | |
| 2014/0040923 A1 | 2/2014 | Tran | |
| 2015/0074078 A1* | 3/2015 | Roche | G06F 16/951 |
| | | | 707/754 |
| 2017/0206326 A1* | 7/2017 | Klein | G06Q 40/08 |
| 2017/0287090 A1* | 10/2017 | Hunn | G06Q 50/18 |
| 2018/0005186 A1* | 1/2018 | Hunn | G06F 16/93 |
| 2018/0315141 A1* | 11/2018 | Hunn | G06F 9/547 |
| 2019/0122317 A1* | 4/2019 | Hunn | H04L 9/0637 |
| 2020/0133964 A1* | 4/2020 | Lee | G06F 16/355 |
| 2020/0184448 A1* | 6/2020 | Jain | G06Q 20/202 |
| 2020/0322132 A1* | 10/2020 | Covaci | H04L 9/3239 |
| 2020/0334375 A1* | 10/2020 | Turgeman | G06F 21/6227 |
| 2020/0334377 A1* | 10/2020 | Turgeman | G06F 21/6245 |
| 2021/0117408 A1* | 4/2021 | Figueredo de Santana | |
| | | | G06F 16/1834 |
| 2021/0166188 A1* | 6/2021 | Enderby | H04L 9/3242 |
| 2021/0174006 A1* | 6/2021 | Stokes | G06Q 50/18 |
| 2021/0182423 A1* | 6/2021 | Padmanabhan | G06F 21/6245 |
| 2021/0226774 A1* | 7/2021 | Padmanabhan | H04L 9/3239 |
| 2022/0292543 A1* | 9/2022 | Henderson | G06Q 30/0252 |
| 2022/0398236 A1* | 12/2022 | Slavin | G06F 16/2246 |
| 2022/0407924 A1* | 12/2022 | Buchmann | G06F 16/288 |

OTHER PUBLICATIONS

Bergquist. "Contract Data Requirements List (CDRL) Best Practices." Defense Acquisition University Huntsville United States, 2020. May 18, 2020 (May 18, 2020) Retrieved on Aug. 26, 2021 (Aug. 26, 2021) from <https://apps.dtic.mil/sti/pdfs/AD1113282.pdf> entire document.

* cited by examiner

SYSTEM AND METHOD FOR IMPLEMENTING A CONTRACT DATA MANAGEMENT MODULE

TECHNICAL FIELD

This disclosure generally relates to data management, and, more particularly, to methods and apparatuses for implementing a contract data management module for automatic generation of a contract data tree structure of a plurality of contracts thereby facilitating visualization of exact location of a specific contract data in the data tree structure.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Today's corporations, agencies, institutions, and other organizations are facing a continuing problem of handling and processing a vast amount of data, particularly in a legal domain, in a quick and expedited manner and managing quality of data received. The vast amount of data often received on a daily basis may be now stored electronically and may need to be analyzed by a variety of persons within the organization relative to business or organizational goals related to legal contracts between an organization and a client or between a first organization and a second organization.

For example, a plurality of contracts that an organization executes may exist in a complicated "tree" relationship, with Master Services Agreements are followed by amendments, then by schedules, and finally by exhibits. In many cases some agreements have multiple parents, making the structure even more complicated. Today, these agreements may be stored, however, in a database (e.g., in Ariba), which may only keep track of the immediate parent, so performing legal research into usage rights sometimes involves reading dozens to hundreds of agreements to even identify the scope of work for research. The need to determine efficiently what data may be available for analysis and research, and how to manage quality of data received across organizational management boundaries to process data in an expedited manner may prove to be extremely time consuming and confusing as the data being tracked increases and no tools to determine exact location of a specific contract data in a tree structure.

SUMMARY

The present disclosure, through one or more of its various aspects, embodiments, and/or specific features or sub-components, provides, among other features, various systems, servers, devices, methods, media, programs, and platforms for implementing a contract data management module for automatic generation of a contract data tree structure of a plurality of contracts thereby facilitating visualization of exact location of a specific contract data in the data tree structure thereby significantly increasing data processing speed and significantly reducing lapse time that may be necessary to manage data quality of data for legal research, but the disclosure is not limited thereto.

According to an aspect of the present disclosure, a method for implementing a data contract management module for automatic generation of a data tree structure by utilizing one or more processors and one or more memories is disclosed. The method may include: providing a database that stores contract metadata associated with a plurality of contracts, wherein the metadata includes relationship information data regarding parentage and/or child relationship between a particular contract and other contracts among the plurality of contracts; accessing the database via a communication network to retrieve the contract metadata including the relationship information data; implementing a search engine; storing the retrieved contract metadata including the relationship information data onto the search engine for creating a linkage between data points; and automatically generating, based on the created linkage between the data points, both an application programming interface (API) and a data tree structure that displays inter-dependency between two or more sets of contracts among the plurality of contracts.

According to another aspect of the present disclosure, wherein the search engine may be configured to provide multitenant-capable full-text search capabilities with a user interface and schema-free JSON documents associated with the plurality of contracts, but the disclosure is not limited thereto.

According to a further aspect of the present disclosure, wherein the user interface may be a Hypertext Transfer Protocol (HTTP) web interface, but the disclosure is not limited thereto.

According to yet another aspect of the present disclosure, the inter-dependency between two or more sets of data contracts may include visual representation of the relationship information data in the data tree structure regarding parentage relationship between the particular contract and the other contracts among the plurality of contracts, but the disclosure is not limited thereto.

According to another aspect of the present disclosure, wherein the inter-dependency between two or more sets of data contracts may include visual representation of the relationship information data in the data tree structure regarding child relationship between the particular contract and the other contracts among the plurality of contracts, but the disclosure is not limited thereto.

According to a further aspect of the present disclosure, wherein the inter-dependency between two or more sets of data contracts may include visual representation of the relationship information data in the data tree structure regarding both parentage and child relationships between the particular contract and the other contracts among the plurality of contracts, but the disclosure is not limited thereto.

According to yet another aspect of the present disclosure, the method may further include: receiving inputs corresponding to particular keywords; and utilizing the data tree structure to perform tree-based searches for the received keywords.

According to another aspect of the present disclosure, a system for implementing a data contract management module for automatic generation of a data tree structure is disclosed. The system may include: a database that stores contract metadata associated with a plurality of contracts, wherein the metadata includes relationship information data regarding parentage and/or child relationship between a particular contract and other contracts among the plurality of contracts; and a processor operatively connected to the database via a communication network, wherein the processor may be configured to: access the database via the communication network to retrieve the contract metadata including the relationship information data; implement a search engine; store the retrieved contract metadata including the relationship information data onto the search engine for creating a linkage between data points; and automatically generate, based on the created linkage between the data points, both an application programming interface (API) and a data tree structure that displays inter-dependency between two or more sets of contracts among the plurality of contracts.

According to a further aspect of the present disclosure, wherein the processor may be further configured to: receive inputs corresponding to particular keywords; and utilize the data tree structure to perform tree-based searches for the received keywords.

According to yet another aspect of the present disclosure, a non-transitory computer readable medium configured to store instructions for automatic generation of a data tree structure is disclosed. The instructions, when executed, may cause a processor to perform the following: accessing the database via a communication network to retrieve contract metadata associated with a plurality of contracts, wherein the metadata includes relationship information data regarding parentage and/or child relationship between a particular contract and other contracts among the plurality of contracts; implementing a search engine; storing the retrieved contract metadata including the relationship information data onto the search engine for creating a linkage between data points; and automatically generating, based on the created linkage between the data points, both an application programming interface (API) and a data tree structure that displays inter-dependency between two or more sets of contracts among the plurality of contracts.

According to a further aspect of the present disclosure, the instructions, when executed, may cause the processor to further perform: receiving inputs corresponding to particular keywords; and utilizing the data tree structure to perform tree-based searches for the received keywords.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
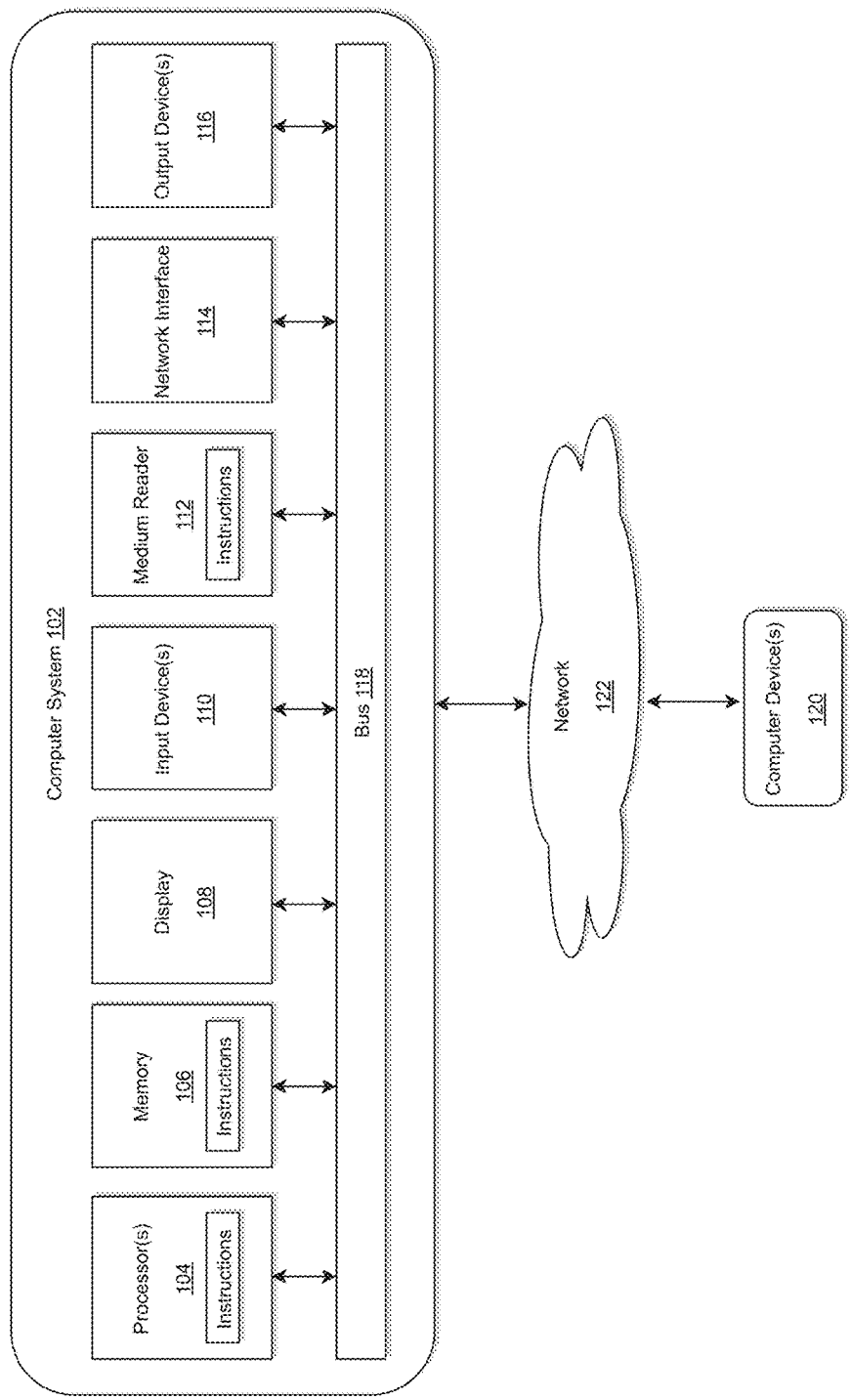
FIG. 1 illustrates a computer system for implementing a contract data management module for automatic generation of a contract data tree structure of a plurality of contracts in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing a contract data management module for automatic generation of a contract data tree structure of a plurality of contracts in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
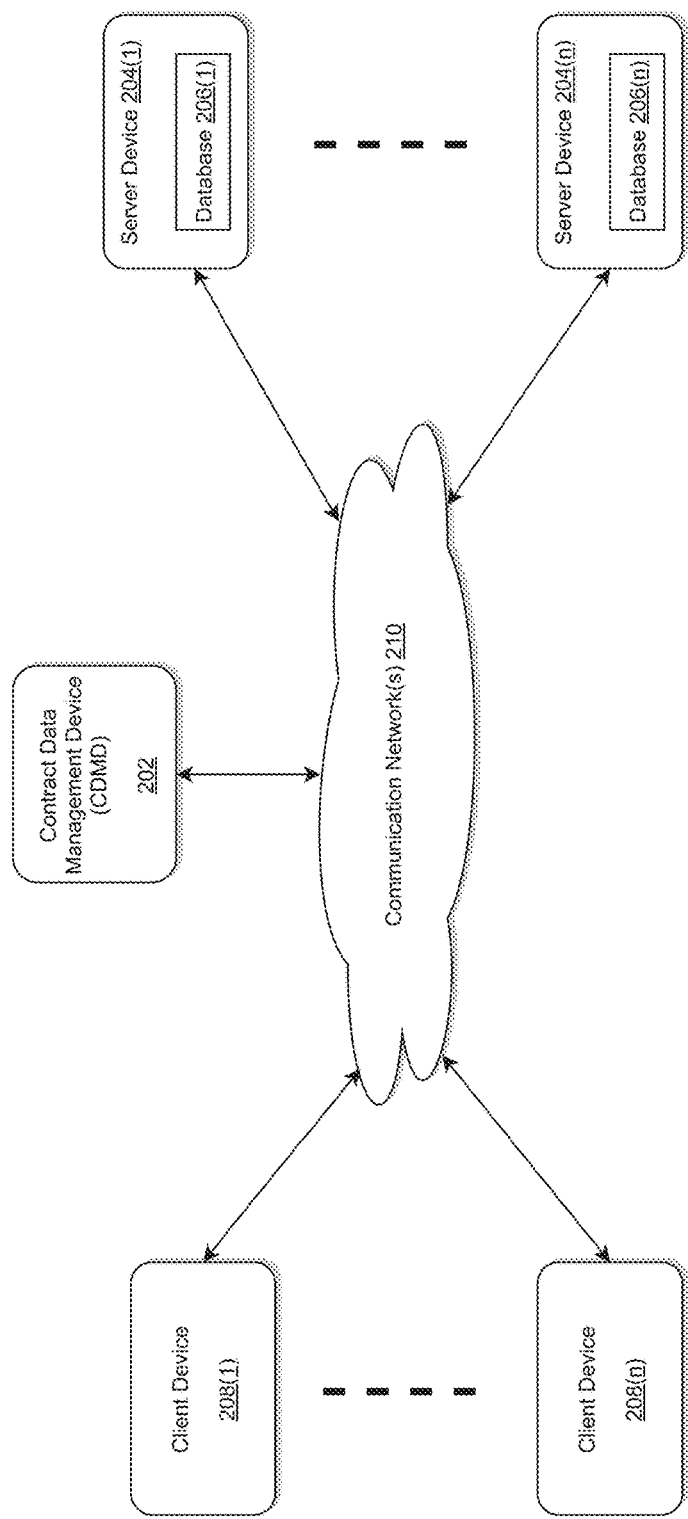
FIG. 2 illustrates an exemplary diagram of a network environment with a contract data management module in accordance with an exemplary embodiment.

Referring to FIG. 2, a schematic of an exemplary network environment 200 for implementing a contract data management device (CDMD) of the instant disclosure is illustrated.

According to exemplary embodiments, the above-described problems associated with conventional approach may be overcome by implementing a CDMD 202 as illustrated in FIG. 2 that may provide a platform for implementing a contract data management module for automatic generation of a contract data tree structure of a plurality of contracts thereby facilitating visualization of exact location of a specific contract data in the data tree structure thereby significantly increasing data processing speed and significantly reducing lapse time that may be necessary to manage data quality of data for legal research, but the disclosure is not limited thereto.

The CDMD 202 may be the same or similar to the computer system 102 as described with respect to FIG. 1.

The CDMD 202 may store one or more applications that can include executable instructions that, when executed by the CDMD 202, cause the CDMD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CDMD 202 itself, may be located in virtual server(s) running in a cloud-based computing environment rather than being tied to one or more specific physical network computing devices. Also, the application(s) may be running in one or more virtual machines (VMs) executing on the CDMD 202. Additionally, in one or more embodiments of this technology, virtual machine(s) running on the CDMD 202 may be managed or supervised by a hypervisor.

In the network environment 200 of FIG. 2, the CDMD 202 is coupled to a plurality of server devices 204(1)-204($n$) that hosts a plurality of databases 206(1)-206($n$), and also to a plurality of client devices 208(1)-208($n$) via communication network(s) 210. A communication interface of the CDMD 202, such as the network interface 114 of the computer system 102 of FIG. 1, operatively couples and communicates between the CDMD 202, the server devices 204(1)-204($n$), and/or the client devices 208(1)-208($n$), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CDMD 202, the server devices 204(1)-204($n$), and/or the client devices 208(1)-208($n$) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CDMD 202 may be a standalone device or integrated with one or more other devices or apparatuses, such as one or more of the server devices 204(1)-204($n$), for example. In one particular example, the CDMD 202 may be hosted by one of the server devices 204(1)-204($n$), and other arrangements are also possible. Moreover, one or more of the devices of the CDMD 202 may be in the same or a different communication network including one or more public, private, or cloud networks, for example.

The plurality of server devices 204(1)-204($n$) may be the same or similar to the computer system 102 or the computer device 120 as described with respect to FIG. 1, including any features or combination of features described with respect thereto. For example, any of the server devices 204(1)-204($n$) may include, among other features, one or more processors, a memory, and a communication interface, which are coupled together by a bus or other communication link, although other numbers and/or types of network devices may be used. The server devices 204(1)-204(n) in this example may process requests received from the CDMD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the CDMD 202 that may efficiently provide a platform for implementing a contract data management module for automatic generation of a contract data tree structure of a plurality of contracts thereby facilitating visualization of exact location of a specific contract data in the data tree structure thereby significantly increasing data processing speed and significantly reducing lapse time that may be necessary to manage data quality of data for legal research, but the disclosure is not limited thereto.

The client devices 208(1)-208(n) may run interface applications, such as standard web browsers or standalone client applications, which may provide an interface to communicate with the CDMD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the CDMD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CDMD 202, the server devices 204(1)-204(n), or the client devices 208(1)-208(n), for example, may be configured to operate as virtual instances on the same physical machine. For example, one or more of the CDMD 202, the server devices 204(1)-204(n), or the client devices 208(1)-208(n) may operate on the same physical device rather than as separate devices communicating through communication network(s) 210. Additionally, there may be more or fewer CDMDs 202, server devices 204(1)-204(n), or client devices 208(1)-208(n) than illustrated in FIG. 2. According to exemplary embodiments, the CDMD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
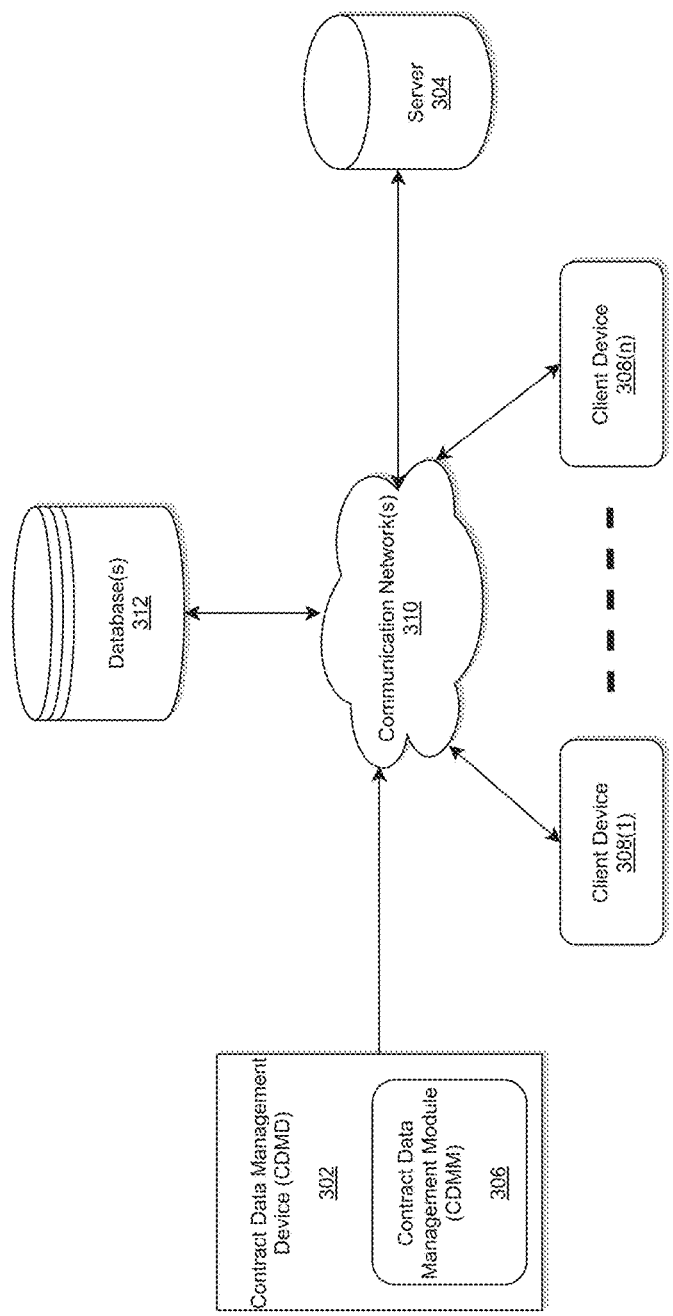
FIG. 3 illustrates a system diagram for implementing a contract data management device with a contract data management module in accordance with an exemplary embodiment.

FIG. 3 illustrates a system diagram for implementing a CDMD having a contract data management module (CDMM) in accordance with an exemplary embodiment.

As illustrated in FIG. 3, the system 300 may include a CDMD 302 within which a CDMM 306 is embedded, a server 304, a database(s) 312, a plurality of client devices 308(1) ... 308(n), and a communication network 310.

According to exemplary embodiments, the CDMD 302 including the CDMM 306 may be connected to the server 304, and the database(s) 312 via the communication network 310. Although there is only one database has been illustrated, the disclosure is not limited thereto. Any number of databases may be utilized. The CDMD 302 may also be connected to the plurality of client devices 308(1) ... 308(n) via the communication network 310, but the disclosure is not limited thereto.

According to exemplary embodiment, the CDMD 302 is described and shown in FIG. 3 as including the CDMM 306, although it may include other rules, policies, modules, databases, or applications, for example. According to exemplary embodiments, the database(s) 312 may be embedded within the CDMD 302. According to exemplary embodiments, the database(s) 312 may be configured to store contract metadata associated with a plurality of contracts, wherein the metadata includes relationship information data regarding parentage and/or child relationship between a particular contract and other contracts among the plurality of contracts etc., but the disclosure is not limited thereto.

According to exemplary embodiments, the CDMM 306 may be configured to receive real-time feed of data from the plurality of client devices 308(1) ... 308(n) via the communication network 310.

According to exemplary embodiments, as will be described below, the CDMM 306 may be configured to access the database 312 via a communication network to retrieve the contract metadata including the relationship information data; implement a search engine; storing the retrieved contract metadata including the relationship information data onto the search engine for creating a linkage between data points; and automatically generate, based on the created linkage between the data points, both an application programming interface (API) and a data tree structure that displays inter-dependency between two or more sets of contracts among the plurality of contracts, but the disclosure is not limited thereto.

The plurality of client devices 308(1) . . . 308(n) are illustrated as being in communication with the CDMD 302. In this regard, the plurality of client devices 308(1) . . . 308(n) may be "clients" of the CDMD 302 and are described herein as such. Nevertheless, it is to be known and understood that the plurality of client devices 308(1) . . . 308(n) need not necessarily be "clients" of the CDMD 302, or any entity described in association therewith herein. Any additional or alternative relationship may exist between either or both of the plurality of client devices 308(1) . . . 308(n) and the CDMD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the CDMD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The CDMD 302 may be the same or similar to the CDMD 202 as described with respect to FIG. 2, including any features or combination of features described with respect thereto.

Figure 4:
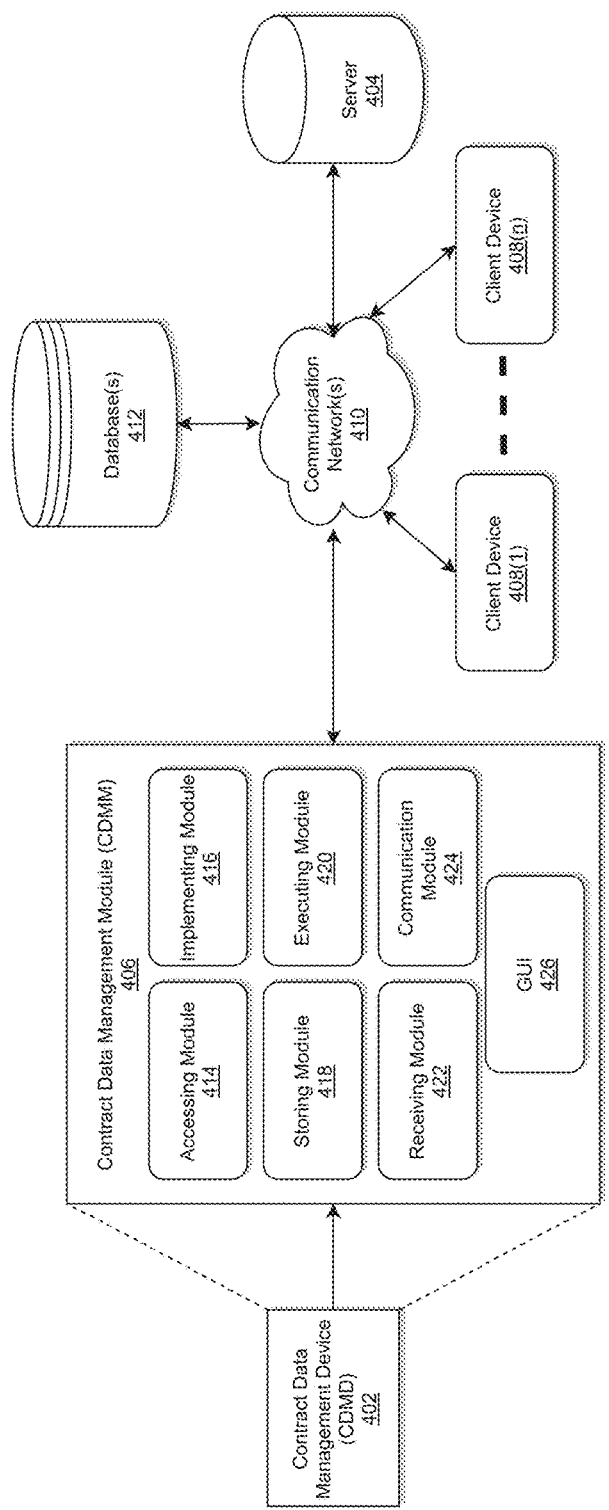
FIG. 4 illustrates a system diagram for implementing a contract data management module of FIG. 3 in accordance with an exemplary embodiment.

FIG. 4 illustrates a system diagram for implementing a contract data management module (CDMM) of FIG. 3 in accordance with an exemplary embodiment.

According to exemplary embodiments, the system 400 may include contract data management device (CDMD) 402 within which a CDMM 406 is embedded, a server 404, a database(s) 412, and a communication network 410.

According to exemplary embodiments, the CDMD 402 including the CDMM 406 may be connected to the server 404, and the database(s) 412 via the communication network 410. The CDMD 402 may also be connected to the plurality of client devices 408(1) . . . 408(n) via the communication network 410, but the disclosure is not limited thereto. According to exemplary embodiments, the CDMD 402, the CDMM 406, the database(s) 412, the server 404, the client devices 408(1)-408(n), and the communication network 410 as illustrated in FIG. 4 may be the same or similar to the CDMD 302, the CDMM 306, the database(s) 312, the server 304, the client devices 308(1)-308(n), and the communication network 310, respectively, as illustrated in FIG. 3.

According to exemplary embodiments, as illustrated in FIG. 4, the CDMM 406 may include an accessing module 414, an implementing module 416, a storing module 418, an executing module 420, a receiving module 422, a communication module 424, and a GUI 426.

The process may be executed via the communication module 424 and the communication network 410, which may comprise plural networks as described above. For example, in an exemplary embodiment, the various components of the CDMM 406 may communicate with the server 404, and the database(s) 412 via the communication module 424 and the communication network 410. Of course, these embodiments are merely exemplary and are not limiting or exhaustive.

According to exemplary embodiments, the communication network 410 and the communication module 424 may be configured to establish a link between the database(s) 412, the client devices 408(1)-408(n) and the CDMM 406.

According to exemplary embodiments, each of the accessing module 414, implementing module 416, storing module 418, executing module 420, receiving module 422, and the communication module 424 may be implemented by microprocessors or similar, they may be programmed using software (e.g., microcode) to perform various functions discussed herein and may optionally be driven by firmware and/or software. Alternatively, each of the accessing module 414, implementing module 416, storing module 418, executing module 420, receiving module 422, and the communication module 424 may be implemented by dedicated hardware, or as a combination of dedicated hardware to perform some functions and a processor (e.g., one or more programmed microprocessors and associated circuitry) to perform other functions. Also, according to exemplary embodiments, each of the accessing module 414, implementing module 416, storing module 418, executing module 420, receiving module 422, and the communication module 424 may be physically separated into two or more interacting and discrete blocks, units, devices, and/or modules without departing from the scope of the inventive concepts.

According to exemplary embodiments, each of the accessing module 414, implementing module 416, storing module 418, executing module 420, receiving module 422, and the communication module 424 of the CDMM 406 may be called by corresponding API, but the disclosure is not limited thereto.

Figure 5:
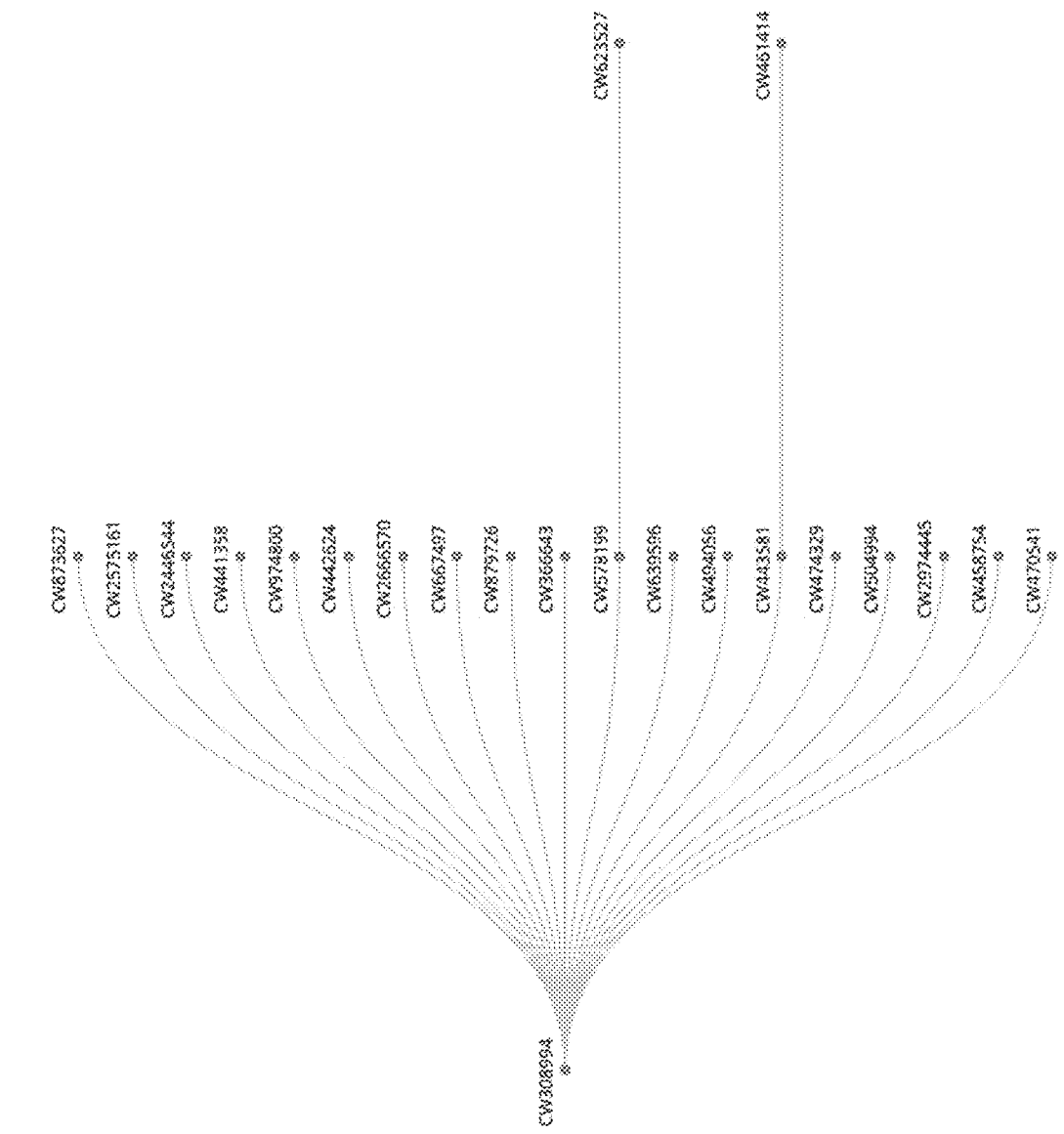
FIG. 5 illustrates an exemplary contract data tree structure in accordance with an exemplary embodiment.
Figure 6:
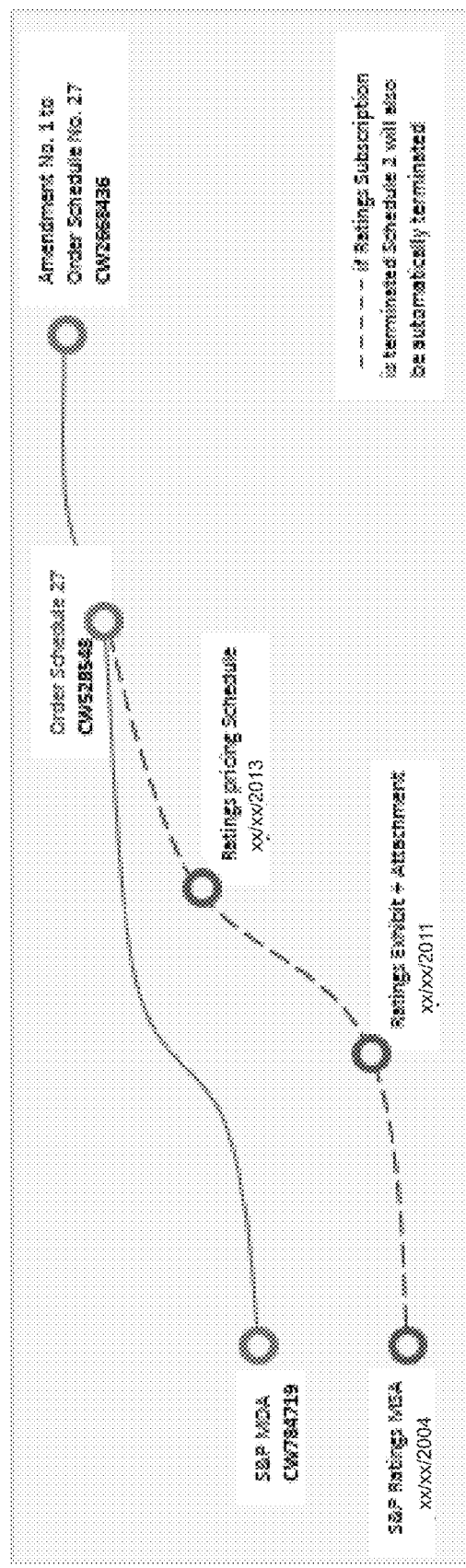
FIG. 6 illustrates another exemplary contract data tree structure depicting an inter-dependency between two sets of contracts in accordance with an exemplary embodiment.

According to exemplary embodiments, FIG. 5 illustrates an exemplary contract data tree structure 500 in accordance with an exemplary embodiment. FIG. 6 illustrates another exemplary contract data tree structure 600 depicting an inter-dependency between two sets of contracts in accordance with an exemplary embodiment.

Referring to FIGS. 4-6, according to exemplary embodiments, the accessing module 414 may be configured to access the database 412 that stores contract metadata associated with a plurality of contracts, wherein the metadata may include relationship information data regarding parentage and/or child relationship between a particular contract and other contracts among the plurality of contracts.

According to exemplary embodiments the accessing module 414 may be configured to access the database 412 via the communication module 424 and the communication network 410 to retrieve the contract metadata including the relationship information data.

According to exemplary embodiments, the implementing module 416 may be configured to implement a search engine.

According to exemplary embodiments, the search engine may be configured to provide multitenant-capable full-text search capabilities with the GUI 426 and schema-free JSON documents associated with the plurality of contracts, but the disclosure is not limited thereto.

According to exemplary embodiments, the GUI 426 may be a Hypertext Transfer Protocol (HTTP) web interface, but the disclosure is not limited thereto.

According to exemplary embodiments, the storing module 418 may be configured to store the retrieved contract metadata including the relationship information data onto the search engine for creating a linkage between data points.

According to exemplary embodiments, the executing module 420 may be configured to automatically generate, based on the created linkage between the data points, both an application programming interface (API) and a data tree structure, e.g., data tree structure 500 (see, e.g., FIG. 5), 600 (see, e.g., FIG. 6) that displays inter-dependency between two or more sets of contracts among the plurality of contracts.

According to exemplary embodiments, as illustrated in the GUIs 500, 600, the inter-dependency between two or more sets of data contracts may include visual representation of the relationship information data in the data tree structure 500, 600 regarding parentage relationship between the particular contract and the other contracts among the plurality of contracts, but the disclosure is not limited thereto.

According to exemplary embodiments, as illustrated in the GUIs 500, 600, the inter-dependency between two or more sets of data contracts may include visual representation of the relationship information data in the data tree structure 500, 600 regarding child relationship between the particular contract and the other contracts among the plurality of contracts, but the disclosure is not limited thereto.

According to exemplary embodiments, as illustrated in the GUIs 500, 600, the inter-dependency between two or more sets of data contracts may include visual representation of the relationship information data in the data tree structure 500, 600 regarding both parentage and child relationships between the particular contract and the other contracts among the plurality of contracts, but the disclosure is not limited thereto.

According to exemplary embodiments, the receiving module 422 may be configured to receive inputs corresponding to particular keywords and the CDMM 406 utilizes the data tree structure 500, 600 to perform tree-based searches for the received keywords.

As illustrated in FIG. 6, the exemplary use case of a contract data tree structure 600 that depicts an inter-dependency between two sets of agreements in accordance with an exemplary embodiment. According to this exemplary use case, the S&P MDA (CW784719) may be a Master Distribution Agreement and Order Schedule 27 specifically grants an organization/firm permission to redistribute S&P credit ratings.

According to exemplary embodiments, the S&P Ratings MSA may be the Master Services Agreement that allows the organization/firm to access the credit ratings and defines the terms for internal use only. According to exemplary embodiments, the Order Schedule 27 may have an explicit clause that states that if the S&P Ratings MSA is terminated then Order Schedule 27 will also be automatically terminated.

Thus, according to this exemplary use case, where the S&P Ratings MSA is terminated S&P MDA (CW784719) would remain in force, as it doesn't grant any permissions to anything without a schedule.

Figure 7:
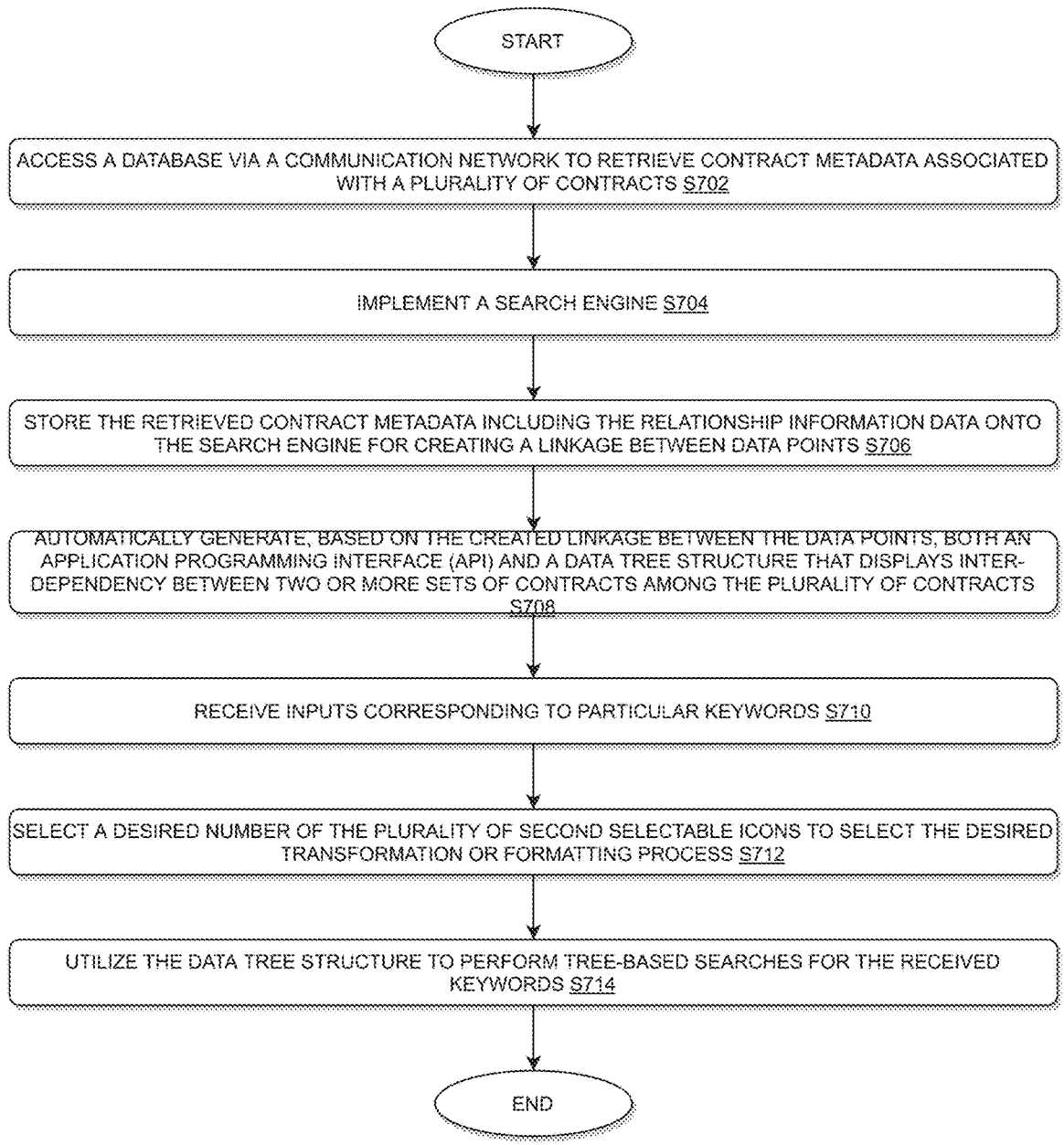
FIG. 7 illustrates a flow chart of implementing a contract data management module for automatic generation of a contract data tree structure of a plurality of contracts in accordance with an exemplary embodiment.

FIG. 7 illustrates a flow chart of a process 700 implemented by the CDMM 406 of FIG. 4 for automatic generation of a contract data tree structure of a plurality of contracts in accordance with an exemplary embodiment.

As illustrated in FIG. 7, at step 702, the process 700 may include accessing a database via a communication network to retrieve contract metadata associated with a plurality of contracts, wherein the metadata includes relationship information data regarding parentage and/or child relationship between a particular contract and other contracts among the plurality of contracts.

At step 704, the process 700 may include implementing a search engine.

At step 706, the process 700 may include storing the retrieved contract metadata including the relationship information data onto the search engine for creating a linkage between data points.

At step 708, the process 700 may include automatically generating, based on the created linkage between the data points, both an application programming interface (API) and a data tree structure that displays inter-dependency between two or more sets of contracts among the plurality of contracts.

At step 710, the process 700 may include receiving inputs corresponding to particular keywords.

At step 712, the process 700 may include selecting a desired number of the plurality of second selectable icons to select the desired transformation or formatting process.

At step 714, the process 700 may include utilizing the data tree structure to perform tree-based searches for the received keywords.

According to exemplary embodiments, the CDMD 402 may include a memory (e.g., a memory 106 as illustrated in FIG. 1) which may be a non-transitory computer readable medium that may be configured to store instructions for implementing a CDMM 406 for automatic generation of a contract data tree structure of a plurality of contracts as disclosed herein. The CDMD 402 may also include a medium reader (e.g., a medium reader 112 as illustrated in FIG. 1) which may be configured to read any one or more sets of instructions, e.g., software, from any of the memories described herein. The instructions, when executed by a processor embedded within the CDMM 406 or within the CDMD 402, may be used to perform one or more of the methods and processes as described herein. In a particular embodiment, the instructions may reside completely, or at least partially, within the memory 106, the medium reader 112, and/or the processor 104 (see FIG. 1) during execution by the CDMD 402.

According to exemplary embodiments, the instructions, when executed, may cause the processor 104 to perform the following: accessing the database via a communication network to retrieve contract metadata associated with a plurality of contracts, wherein the metadata includes relationship information data regarding parentage and/or child relationship between a particular contract and other contracts among the plurality of contracts; implementing a search engine, storing the retrieved contract metadata including the relationship information data onto the search engine for creating a linkage between data points; and automatically generating, based on the created linkage between the data points, both an application programming interface (API) and a data tree structure that displays inter-dependency between two or more sets of contracts among the plurality of contracts.

According to exemplary embodiments, wherein, the instructions, when executed, may further cause the processor 104 to perform the following: receiving inputs corresponding to particular keywords; and utilizing the data tree structure to perform tree-based searches for the received keywords.

According to exemplary embodiments as disclosed above in FIGS. 1-7, technical improvements effected by the instant disclosure may include a platform for implementing a contract data management module for automatic generation of a contract data tree structure of a plurality of contracts thereby facilitating visualization of exact location of a specific contract data in the data tree structure thereby significantly increasing data processing speed and significantly reducing lapse time that may be necessary to manage data quality of data for legal research, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatic generation of a data tree structure by utilizing one or more processors and one or more memories, the method comprising:

providing a database that stores contract metadata associated with a plurality of contracts, wherein the metadata includes relationship information data regarding parentage and/or child relationship between a particular contract and other contracts among the plurality of contracts;

accessing the database via a communication network to retrieve the contract metadata including the relationship information data;

implementing a search engine, wherein the search engine is configured to provide multitenant-capable full-text search capabilities with a user interface and schema-free JSON documents associated with the plurality of contracts;

storing the retrieved contract metadata including the relationship information data onto the search engine for creating a linkage between data points;

automatically generating, based on the created linkage between the data points, both an application programming interface (API) and a data tree structure that displays inter-dependency between two or more sets of contracts among the plurality of contracts;

receiving inputs via the user interface corresponding to particular keywords;

utilizing the data tree structure to perform tree-based searches for the received keywords;

displaying exact location of a specific contract data in the data tree structure in the user interface thereby increasing data processing speed and reducing lapse time that is necessary to manage data quality of data for the tree-based searches.

2. The method according to claim 1, wherein the user interface is a Hypertext Transfer Protocol (HTTP) web interface.

3. The method according to claim 1, wherein the inter-dependency between two or more sets of data contracts includes visual representation of the relationship information data in the data tree structure regarding parentage relationship between the particular contract and the other contracts among the plurality of contracts.

4. The method according to claim 1, wherein the inter-dependency between two or more sets of data contracts includes visual representation of the relationship information data in the data tree structure regarding child relationship between the particular contract and the other contracts among the plurality of contracts.

5. The method according to claim 1, wherein the inter-dependency between two or more sets of data contracts includes visual representation of the relationship information data in the data tree structure regarding both parentage and child relationships between the particular contract and the other contracts among the plurality of contracts.

6. A system for automatic generation of a data tree structure comprising:

a database that stores contract metadata associated with a plurality of contracts, wherein the metadata includes relationship information data regarding parentage and/or child relationship between a particular contract and other contracts among the plurality of contracts; and a processor operatively connected to the database via a communication network, wherein the processor is configured to:

access the database via the communication network to retrieve the contract metadata including the relationship information data;

implement a search engine, wherein the search engine is configured to provide multitenant-capable full-text search capabilities with a user interface and schema-free JSON documents associated with the plurality of contracts;

store the retrieved contract metadata including the relationship information data onto the search engine for creating a linkage between data points;

automatically generate, based on the created linkage between the data points, both an application programming interface (API) and a data tree structure that displays inter-dependency between two or more sets of contracts among the plurality of contracts;

receive inputs via the user interface corresponding to particular keywords;

utilize the data tree structure to perform tree-based searches for the received keywords;

display exact location of a specific contract data in the data tree structure in the user interface thereby increasing data processing speed and reducing lapse time that is necessary to manage data quality of data for the tree-based searches.

7. The system according to claim 6, wherein the user interface is a Hypertext Transfer Protocol (HTTP) web interface.

8. The system according to claim 6, wherein the inter-dependency between two or more sets of data contracts includes visual representation of the relationship information data in the data tree structure regarding parentage relationship between the particular contract and the other contracts among the plurality of contracts.

9. The system according to claim 6, wherein the inter-dependency between two or more sets of data contracts includes visual representation of the relationship information data in the data tree structure regarding child relationship between the particular contract and the other contracts among the plurality of contracts.

10. The system according to claim 6, wherein the inter-dependency between two or more sets of data contracts includes visual representation of the relationship information data in the data tree structure regarding both parentage and child relationships between the particular contract and the other contracts among the plurality of contracts.

11. A non-transitory computer readable medium configured to store instructions for automatic generation of a data tree structure, wherein, when executed, the instructions cause a processor to perform the following:

accessing the database via a communication network to retrieve contract metadata associated with a plurality of contracts, wherein the metadata includes relationship information data regarding parentage and/or child relationship between a particular contract and other contracts among the plurality of contracts;

implementing a search engine, wherein the search engine is configured to provide multitenant-capable full-text search capabilities with a user interface and schema-free JSON documents associated with the plurality of contracts;

storing the retrieved contract metadata including the relationship information data onto the search engine for creating a linkage between data points;

automatically generating, based on the created linkage between the data points, both an application programming interface (API) and a data tree structure that displays inter-dependency between two or more sets of contracts among the plurality of contracts;

receiving inputs via the user interface corresponding to particular keywords;

utilizing the data tree structure to perform tree-based searches for the received keywords;

displaying exact location of a specific contract data in the data tree structure in the user interface thereby increasing data processing speed and reducing lapse time that is necessary to manage data quality of data for the tree-based searches.

12. The non-transitory computer readable medium according to claim 11, wherein the inter-dependency between two or more sets of data contracts includes visual representation of the relationship information data in the data tree structure regarding parentage relationship between the particular contract and the other contracts among the plurality of contracts.

13. The non-transitory computer readable medium according to claim 11, wherein the inter-dependency between two or more sets of data contracts includes visual representation of the relationship information data in the data tree structure regarding child relationship between the particular contract and the other contracts among the plurality of contracts.

14. The non-transitory computer readable medium according to claim 11, wherein the inter-dependency between two or more sets of data contracts includes visual representation of the relationship information data in the data tree structure regarding both parentage and child relationships between the particular contract and the other contracts among the plurality of contracts.

15. The non-transitory computer readable medium according to claim 11, wherein the user interface is a Hypertext Transfer Protocol (HTTP) web interface.

\* \* \* \* \*